(12) United States Patent
Parihar et al.

(10) Patent No.: US 9,867,109 B1
(45) Date of Patent: Jan. 9, 2018

(54) DYNAMICALLY BLOCKING OF BASE STATION IN RESPONSE TO THRESHOLD HIGH EXTENT OF CHANGE OF THE BASE STATION'S COVERAGE IDENTIFER

(71) Applicant: Sprint Spectrum L.P., Overland Park, KS (US)

(72) Inventors: Vanil Parihar, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/259,704

(22) Filed: Sep. 8, 2016

(51) Int. Cl.
*H04W 36/00* (2009.01)
*H04W 36/30* (2009.01)
*H04L 12/26* (2006.01)
*H04W 36/08* (2009.01)
*H04W 40/22* (2009.01)
*H04B 17/318* (2015.01)
*H04W 88/02* (2009.01)
*H04W 88/08* (2009.01)

(52) U.S. Cl.
CPC .......... *H04W 36/30* (2013.01); *H04B 17/318* (2015.01); *H04L 43/16* (2013.01); *H04W 36/08* (2013.01); *H04W 40/22* (2013.01); *H04W 88/02* (2013.01); *H04W 88/08* (2013.01)

(58) Field of Classification Search
CPC ..................................................... H04W 36/30
See application file for complete search history.

(56) References Cited

U.S. PATENT DOCUMENTS

| 9,351,220 | B2 * | 5/2016 | Tamura | H04W 24/10 |
| 2012/0014308 | A1 * | 1/2012 | Li | H04W 24/02 370/312 |
| 2014/0192638 | A1 * | 7/2014 | Taneja | H04W 28/0268 370/229 |
| 2015/0146686 | A1 * | 5/2015 | Huang | H04W 36/08 370/331 |

* cited by examiner

Primary Examiner — Mazda Sabouri (57) ABSTRACT

Disclosed are methods and systems for a user equipment device (UE) to avoid being served by a base station that experiences a threshold high extent of change of the base station's coverage identifier. In particular, the UE may detect a threshold high extent of change of a coverage identifier of a first base station, and may responsively configure itself to avoid being served by the first base station. In this way, if the UE is being served by the first base station, then the configuring may cause the UE to trigger a handover from being served by the first base station to being served by a second base station. Whereas, if the UE is not currently being served by the first base station, then the configuring effectively blacklists the first base station, such that the UE avoids attaching to and/or handing over to the first base station in the future.

20 Claims, 5 Drawing Sheets

DYNAMICALLY BLOCKING OF BASE STATION IN RESPONSE TO THRESHOLD HIGH EXTENT OF CHANGE OF THE BASE STATION'S COVERAGE IDENTIFER

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with various industry standards, a base station may provide multiple cells in various directions and/or on various carrier frequencies, and each such cell may have a respective coverage identifier. For example, in accordance with a recent version of the LTE standard, each base station may have a global base station ID and each cell of a base station may have a cell ID. Thus, at the system level, each combination of global base station ID and cell ID may define a globally unique identifier for a cell. Generally, this globally unique identifier may be referred to as an Evolved Universal Terrestrial Radio Access Network (E-UTRAN) cell global identifier (ECGI). Moreover, at the physical level, each cell provided by the base station also has a physical cell identifier (PCI) that is identifiable by a UE. While an ECGI is globally unique within a public land network, there are only 504 possible PCIs. Thus, PCIs are likely to be repeated many times throughout a public land mobile network.

In a system arranged as described above, each coverage identifier may be indicated to UEs by broadcast message(s) or the like of the respective cell. In this way, a UE could detect broadcast of coverage identifiers to facilitate attachment and/or handover processes.

For example, when a UE first powers on or enters into coverage of a wireless communication system, the UE may scan for pilot or reference signals and may determine a signal strength for each detected signal (e.g., a received strength or signal-to-noise ratio). Also, the UE may identify a cell providing the strongest pilot or reference signal, and may engage in a process to register with the network by transmitting an attach request to the base station that is providing that signal. The UE may then engage in attach signaling with the base station, by which the UE would register to be served by the base station on the identified cell. Through the attach process and/or subsequently, the base station and supporting network infrastructure may establish for the UE one or more bearers, essentially defining logical tunnels for carrying bearer data between the UE and a transport network such as the Internet. Once attached with the base station, the UE may then operate in a "connected" mode in which the base station may schedule data communication to and from the UE on the UE's established bearer(s).

In another example, a wireless communication system may support handover of a UE from one cell to another. For instance, when a first base station is serving a UE and the UE detects sufficiently strong coverage from a cell of a second base station, the UE may send a report to the first base station indicating the detected coverage identifier of the cell of the second base station. The first base station may in turn determine if applicable handover thresholds are met. If so, the first base station may engage in handover signaling via an interface with the second base station to orchestrate handover of the UE to the reported cell.

Overview

In practice, due to rollout of one or more new base stations in a wireless communication system or for other reasons, neighboring cells may end up having the same coverage identifier as one another, which could lead to various problematic scenarios. For example, a scenario known as PCI collision may occur when a UE is positioned in an overlapping region of two cells that use an identical PCI. In such a scenario, the UE may receive the same PCI from both cells and thus may encounter problems with proper detection of those cells and/or with communication on those cells, among other issues. In another example, a scenario known as PCI confusion may occur when a serving cell of a UE has two neighboring cells with the same PCI. In such a scenario, when the base station providing the serving cell seeks to hand over the UE to one of those neighboring cells, the base station may not be able to unambiguously provide network entities with identify of the target cell, which may result in a failed handover and/or other issues.

Given the various operating challenges that may arise due to neighboring cells having the same coverage identifier, various approaches have been developed for a wireless communication system to overcome these challenges. For instance, the system may respond to detection of PCI collision and/or PCI confusion by respectively changing PCIs of one or more cells in the network. In doing so, the system may ensure that neighboring cells do not have identical PCIs.

But such a change of a coverage identifier may then lead to other issues. For example, a change of a coverage identifier of a base station may cause a served UE to lose connectivity with that base station. More specifically, in accordance with various industry standards, a change of a coverage identifier of a base station may cause that base station to undergo a reset procedure in which the base station completely restarts its operations or restores a previous state of operation. So when a serving base station undergoes such a reset procedure, a served UE may consequently lose connectivity with the serving base station.

Generally, such a loss of connectivity with a base station may lead to various issues. For example, a loss of connectivity with a base station may lead to issues such as dropped calls and/or reduced quality of service for a served UE. In another example, if the served UE itself provides connectivity for one or more other devices (e.g., the UE operates as a hotspot or a relay-UE module), then the UE's loss of connectivity with its serving base station may impact those connected devices. Specifically, the connected devices may no longer be able to properly engage in communication with the system via the UE, thereby leading to dropped calls and/or reduced quality of service for those devices, among other issues. As such, a UE may lose connectivity with the network due to change of a coverage identifier of a base station, and a frequent change of a coverage identifier of a base station may result in a recurring loss of connectivity for the UE and/or for other devices connected to the UE.

Disclosed herein are methods and systems to help minimize problems resulting from frequent change of a coverage identifier. In accordance with the disclosure, a UE may detect a threshold high extent of change of a coverage identifier of a first base station. And the UE may respond to detecting that threshold high extent of change by configuring itself to avoid being served by the first base station. If the UE is already being served by the first base station, then the configuring may involve the UE handing over from being served by the first base station to being served by a second base station. Whereas, if the UE is not currently being served by the first base station, then the configuring may involve blacklisting the first base station, such that the UE avoids attaching to and/or handing over to the first base station in the future. In either case, the disclosed approach may allow the UE to avoid being served by any base station that experiences a relatively frequent change of a coverage identifier and thus to avoid a recurring loss of connectivity with the network.

Accordingly, in one respect, disclosed is a method. In accordance with the method, a UE may detect a threshold high extent of change of a coverage identifier of a first base station. In response to detecting the threshold high extent of change of the coverage identifier of the first base station, the UE may configure itself to avoid being served by the first base station.

In another respect, disclosed is a UE. The UE may include one or more processors, data storage, and program instructions stored on the data storage. In particular, the program instructions may be executable by the one or more processors to detect a threshold high extent of change of a coverage identifier of a first base station. Also, the program instructions may be executable, in response to detecting the threshold high extent of change of the coverage identifier of the first base station, to configure the UE to avoid being served by the first base station In yet another respect, disclosed is a relay. The relay includes a relay base station (relay-BS) operable to serve one or more end-user UEs over a relay coverage interface, a relay-UE operable to provide wireless backhaul connectivity for the relay-BS, and a controller configured to carry out operations. The controller may be part of the relay-UE, may be part of the relay-BS, or may be separate from the relay-BS and the relay-UE, among other possibilities. In either case, the operations may involve detecting a threshold high extent of change of a coverage identifier of a first base station. Also, the operations may involve, in response to detecting the threshold high extent of change of the coverage identifier of the first base station, configuring the relay-UE to avoid being served by the first base station.

Still further, in yet another respect, disclosed is a non-transitory computer-readable medium having stored thereon instructions executable by a processor to cause a UE to dynamically block a base station in response to detecting threshold high extent of change of the base station's coverage identifier.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of an example communication system in which the present method can be implemented. The illustrated communication system includes representative base stations 10 and 12 each interconnected with network infrastructure 14, such as a switch and/or gateway, providing connectivity with one or more transport networks 16 such as the PSTN and/or the Internet. Each such base station may be configured to serve one or more relays and could thus be referred to as a donor base station once the base station begins to serve one or more such relays.

Figure 1:
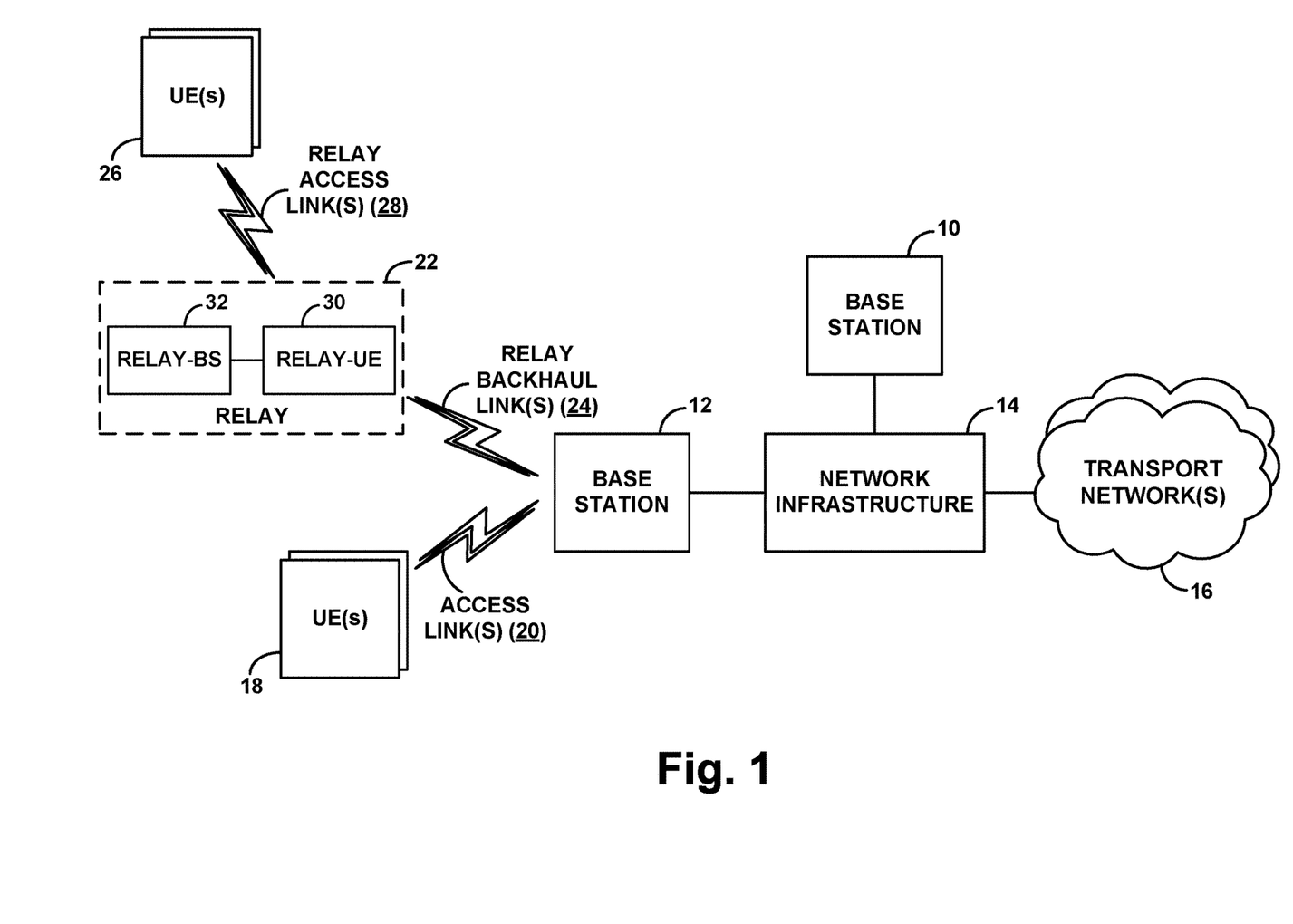
FIG. 1 is a simplified block diagram of a wireless communication system in which the present method can be implemented.

FIG. 1 illustrates that the base station 12 may serve one or more end-user UEs 18 respectively over one or more access links 20 and may also serve a relay 22 over one or more relay backhaul links 24. Further, FIG. 1 illustrates that the relay 22 may then itself serve one or more end-user UEs 26 respectively over one or more relay access links 28. Moreover, the relay 22 is shown as including a relay-UE 30 and a relay-BS 32. In practice, the relay-UE 30 may be served by the donor base station 12 and may thus provide wireless backhaul connectivity for the relay-BS 32 via the one or more relay backhaul links 24. And the relay-BS 32 could then serve one or more end-user UEs 26 via one or more relay access links 28. In this arrangement, the relay-UE 30 and relay-BS 32 could be integrated together as a single relay device or could be provided as separate devices communicatively linked together (e.g., via a local area network or other connection).

Through this communication system, each of the one or more UEs 18 may thus engage in communication on the transport network(s) 16 via at least one of the access links 20, the base station 12, and the network infrastructure 14. Also, each of the one or more UEs 26 may engage in communication on the transport network(s) 16 via at least one of the relay access links 28, the relay 22, at least one of the relay backhaul links 24, the base station 12, and the network infrastructure 14. Moreover, the base station 12

(and/or the relay 22) may be licensed or otherwise arranged to engage in wireless communications using one or more carriers each defining a particular frequency or range of frequencies. Other arrangements are possible as well.

In a system arranged as described above, a base station may have various associated identifiers that UEs (and/or network entities) may use to identify the base station. For example, in accordance with LTE as noted above, each base station may have a global base station ID and each cell of a base station may have a cell ID. Generally, each combination of global base station ID and cell ID may be used at the system level to define a globally unique identifier for a cell (could be referred to as ECGI). In this way, each ECGI (and/or cell ID) may be globally unique within a public land network at the system level. Further, at the physical level, each cell provided by the base station also has a PCI that is identifiable by a UE. And in accordance with LTE, there are only 504 possible PCIs. Thus, in contrast with ECGIs and cell IDs, PCIs may be repeated many times throughout a public land mobile network.

Furthermore, a UE could detect or otherwise determine various base station identifiers in various ways. Under LTE, for example, a base station may transmit a primary synchronization signal (PSS) and a secondary synchronization signal (SSS) on each cell (e.g., within a certain range of resource elements above and below the center frequency of the cell). The PSS carries a coded value, and the SSS carries a coded value. With this arrangement, the UE may search for the PSS of a cell (e.g., by looking for a PSS value that periodically recurs as expected) so as to lock onto sub-frame timing of the cell. The UE may then read the SSS of the cell (e.g., by looking at resource elements located one symbol period before identified resource elements of the PSS) to lock onto frame timing of the cell. Once the UE ascertains the PSS value and SSS value, the UE can then compute a PCI value of the cell (e.g., as a predefined function of those values). And given the PCI, the UE may then able to determine which resource elements on the air interface carry a reference signal, so that the UE can read and evaluate the strength of the reference signal.

In another example, under LTE, each base station may store a mapping between the PCI and cell ID of each of its cells. In this case, the base station may be configured to broadcast (e.g., from time-to-time and/or upon a UE's request), to a UE, the base station's mapping between a certain PCI and a corresponding cell ID, and perhaps also broadcast the base station's corresponding ECGI. In another case, the base station may be configured to receive information regarding cells provided by a neighboring base station. For instance, the neighboring base station may send to the base station an indication of (i) the neighboring base station's ECGI and (ii) the cell ID and corresponding PCI of each cell provided by the neighboring base station. And the base station may store that received information. Thus, the base station may have a record of the neighboring base station's ECGI and a mapping between the PCI and cell ID of each cell provided by the neighboring base station. In this case, the base station may broadcast, to a UE, the neighboring base station's mapping between a certain PCI and a corresponding cell ID, and perhaps also broadcast the neighboring base station's corresponding ECGI. In either case, using the above-described mapping information, the UE may identify a cell ID (and/or ECGI) corresponding to a PCI of a cell, or vice versa. Other examples are also possible.

As noted above, the present disclosure provides for an approach to help minimize problems resulting from frequent change of a coverage identifier (e.g., PCI). In practice, the disclosed approach could be carried out in the context of a relay-UE, such as relay-UE 30, seeking to avoid service by a first base station that experiences a threshold high extent of change of a coverage identifier. For simplicity, however, the disclosed approach will be described here in the context of an end-user UE, such as a UE 18, seeking to avoid service by a first base station that experiences a threshold high extent of change of a coverage identifier.

In accordance with the disclosure, the UE 18 may detect a threshold high extent of change of a coverage identifier (e.g., PCI) of a first base station (e.g., base station 12) and may respond to the detecting of the threshold high extent of change by configuring itself to avoid being served by the first base station.

In an example implementation, the UE 18 may use various techniques to determine an instance of change of a coverage identifier of the first base station. By way of example, the UE 18 may from time-to-time scan coverage of the first base station and may record a coverage identifier value (e.g., a PCI value) of the first base station after each such scan. By then maintaining a record of coverage identifier values of the first base station over time, the UE 18 may refer to this record so as to detect an instance of change of a coverage identifier of the first base station.

More specifically, in line with the discussion above, the UE 18 may scan the first base station's coverage and may receive signals indicating a first coverage identifier value (e.g., first PCI value) of the first base station as well as signals indicating a unique identifier of the first base station (e.g., a cell ID of the first base station or an ECGI of the first base station). Upon receiving such signals, the UE 18 may responsively establish and maintain first mapping data that maps the first coverage identifier value with the unique identifier as discuss above. Then, the UE 18 may subsequently again scan the first base station's coverage and may receive signals indicating a second coverage identifier value (e.g., second PCI value) of the first base station as well as signals indicating the unique identifier of the first base station. Upon subsequently receiving those signals, the UE 18 may responsively establish and maintain second mapping data that maps the second coverage identifier value with the unique identifier, and so on. In this way, when the UE 18 refers to the mapping data, the UE 18 may use the recorded unique identifier as basis to determine that the data represents coverage identifier values of the first base station over time. With this arrangement, the UE 18 could thus compare the first and second mapping data and may detect an instance of change of the first base station's coverage identifier by determining that the first coverage identifier value is different from the second coverage identifier value while the unique identifier remains the same. Other examples are also possible.

Furthermore, the UE 18 may use various techniques to detect the threshold high extent of change of the coverage identifier of the first base station. By way of example, the UE 18 may maintain a counter indicative of the extent of change of the coverage identifier of the first base station. With this arrangement, the UE 18 may detect an instance of change of the coverage identifier of the first base station, such as by using the above-described technique for instance, and may respond to detecting the instance of change by incrementing the counter by a value of one. As such, each time that the UE 18 detects an instance of change of the coverage identifier of the first base station, the UE 18 may increment the counter by a value of one, thereby maintaining a count indicative of the extent of change of the coverage identifier of the first base station. In this way, the UE 18 may detect the threshold high extent of change by determining that the value of the counter is above a threshold counter value (e.g., established via manual engineering input). Other examples are also possible.

Yet further, detecting that the extent of change of the coverage identifier of the first base station is threshold high may take various forms. For example, detecting the threshold high extent of change may involve the UE 18 determining that the coverage identifier of the first base station changed at least a threshold number of times over a particular time period. Generally, this particular time period may be a certain duration, such as a one hour time period for instance. However, the particular time period could take on other forms as well without departing from the scope of the present disclosure. Other implementations are also possible.

Figure 2:
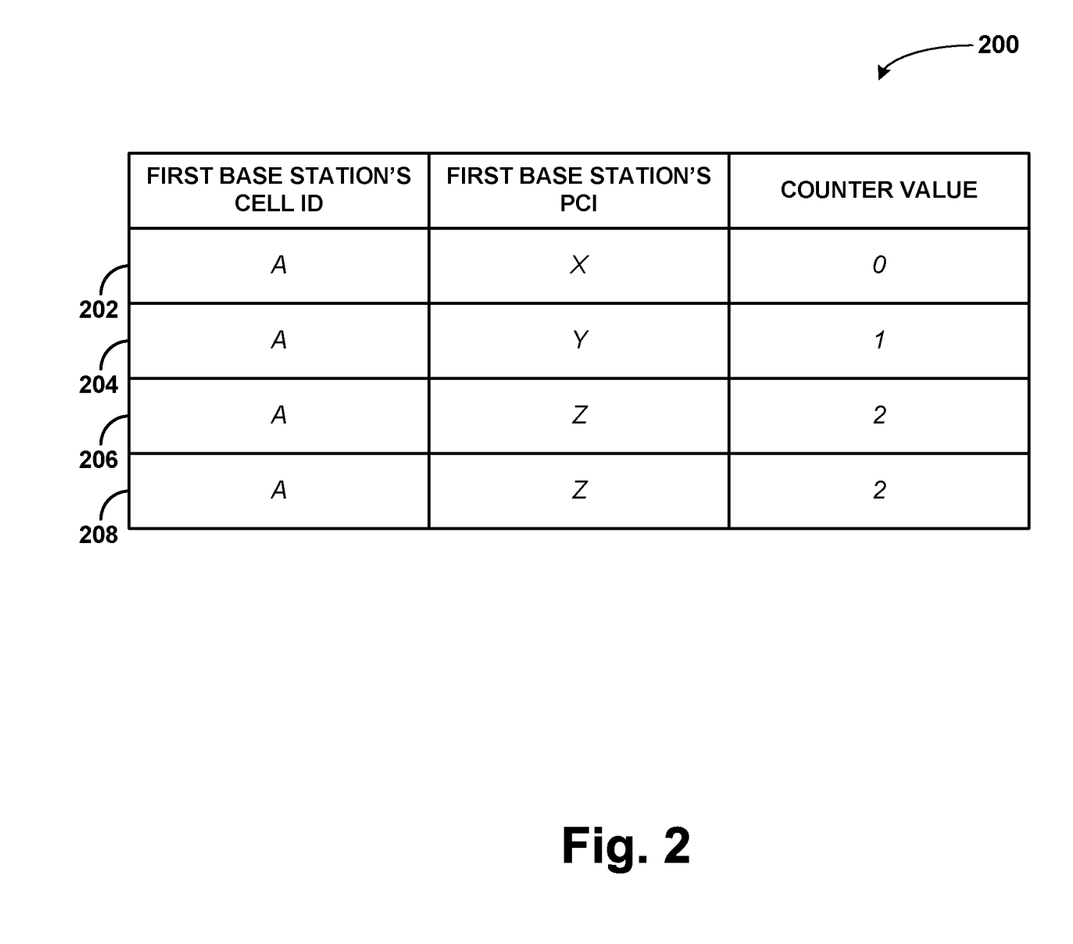
FIG. 2 is a mapping illustrative of a technique to determine an extent of change of a base station's PCI.

FIG. 2 next shows example mapping 200 illustrative of the above-described technique of determining an extent of change of a base station's coverage identifier. In particular, row 202 of the mapping 200 shows the first base station's recorded cell ID and PCI following an initial scan of the first base station's coverage. As shown, the first base station's cell ID is "A", the first base station's recorded PCI is "X", and the counter value is initially (e.g., when the UE begins tracking the first base station's PCI) set to a value zero. Next, row 204 of mapping 200 shows the first base station's cell ID and PCI as recorded following a subsequent scan. As shown, the first base station's cell ID remains "A" and thus the UE 18 can determine based on that cell ID that the scan detected the first base station's coverage. Also, the first base station's recorded PCI is shown to be "Y". Thus, the UE 18 may detect an instance of change of the first base station's PCI from "X" to "Y" and may responsively increment the counter by a value of one, so as to result in a counter value of one.

Further, row 206 of mapping 200 shows the first base station's cell ID and PCI as recorded following another subsequent scan. As shown, the first base station's cell ID remains "A" and thus the UE 18 can again determine based on that cell ID that the scan detected the first base station's coverage. Also, the first base station's recorded PCI is shown to be "Z". Thus, the UE 18 may detect an instance of change of the first base station's PCI from "Y" to "Z" and may responsively increment the counter by a value of one, so as to result in a counter value of two. Yet further, row 208 of mapping 200 shows the first base station's cell ID and PCI recorded following yet another subsequent scan. As shown, the first base station's cell ID remains "A" and thus the UE 18 can yet again determine based on that cell ID that the scan detected the first base station's coverage. Moreover, row 208 shows that the first base station's recorded PCI remains "Z". Thus, the UE 18 may detect that the first base station's PCI is unchanged and may responsively maintain the counter value of two. Other illustrations are also possible.

Once the UE 18 detects the threshold high extent of change of the coverage identifier of the first base station, the UE 18 may responsively configure itself to avoid being served by the first base station. In practice, the configuring may essentially serve as a logical trigger for the UE 18 to carry out further operations and those operations may be based on whether or not the UE 18 is currently being served by the first base station.

In a first scenario, if the first base station is not currently serving the UE 18, then the configuring involves the UE 18 storing (e.g., at a data storage of the UE 18) an indication that the UE 18 should not be served by the first base station. In this way, when the UE 18 encounters a process that may cause the UE 18 to be served by a base station on which it is not currently being served (e.g., detecting high signal strength from such a base station), the stored indication may serve as basis for the UE 18 to avoid being served by the first base station and thus instead be served by a second base station (e.g., a base station with a second strongest detected signal strength) other than the first base station.

For example, the UE 18 may search for a base station to attach to and, while doing so, may detect coverage on the first base station. But based on the stored indication, the UE 18 may not seek to attach to the first base station. So assuming that the UE 18 also detected coverage on the second base station, the UE 18 may instead attach to the second base station by engaging in attach signaling with the second base station.

In another example, while a base station serves the UE 18, the UE 18 may generate a measurement report that specifies detected coverage of one or more candidate base stations, possibly including the second base station. Assuming that the UE 18 also detects coverage on the first base station, the UE 18 may use the stored indication as basis to exclude the first base station from being specified in that report. Then, the UE 18 may trigger a handover process by transmitting the generated measurement report to the serving base station and the serving base station (and/or another entity) may make a handover decision based on the received report. Specifically, due to the first base station being excluded, the decision likely won't be to hand over the UE 18 to be served by the first base station. Rather, the decision may be to hand over the UE 18 to be served by one of the candidate base stations specified in the measurement report. For instance, assuming two or more candidate base station are specified, the decision may be to hand over the UE 18 to be served by the second base station based on the second base station having the strongest detected signal strength among the candidate base stations. Thus, the serving base station may engage in handover signaling to hand over the UE 18 to be served by the second base station. Other examples are also possible.

In a second scenario, if the first base station is currently serving the UE 18, then the configuring may serve as a logical trigger for the UE 18 to responsively invoke a process to cause the UE 18 to be served by a second base station. For example, the configuring of the UE 18 may involve the UE 18 engaging in communication with the wireless communication system to trigger a handover of the UE 18 from being served by the first base station to being served by the second base station. Specifically, the UE 18 may generate a measurement report that specifies the second base station. But the UE 18 may also generate that measurement report to not specify the first base station, thereby excluding the first base station from being specified in the measurement report. Once the measurement report is generated, the UE 18 may transmit the generated report to the first base station. Then, based on the second base station having the strongest detected signal strength and the first base station not being specified in the report, the serving first base station (and/or another entity) may decide to hand over the UE 18 to be served by the second base station. Thus, the first base station may then engage in handover signaling to hand over the UE 18 to be served by the second base station.

Moreover, in the context of the second scenario, the configuring may additionally or alternatively involve the UE 18 storing an indication that the UE 18 should not be served the first base station. In this way, when the UE 18 encounters in the future a process that may cause the UE to be served by a base station that is not currently serving the UE (e.g., a handover process or a search for a base station to attach to), the stored indication may serve as basis for the UE 18 to avoid being served by the first base station and thus instead be served by a second base station other than the first base station. Other scenarios are also possible.

Furthermore, when the UE 18 invokes a process that causes the UE 18 to be served by a base station on which it is not currently being served, the UE 18 may carry out operations that impact the decision of which base station ultimately serves the UE 18. For example, the UE 18 may make a determination that a second base station is a base station other than the first base station. In practice, the UE 18 may do so by determining that a unique identifier (e.g., a cell ID or an ECGI) of the first base station is different from a unique identifier of the second base station or may do so in other ways. In either case, based at least on the determination that the second base station is a base station other than the first base station, the UE 18 may invoke a process to cause the UE 18 to be served by the second base station. For instance, depending on the scenario, the UE 18 could use the determination as basis for including the second base station in a measurement report or could use the determination as basis for deciding to engage in attach signaling with the second base station.

In another example, the UE 18 may determine that the second base station did not experience a threshold high extent of change of the second base station's coverage identifier. For instance, the UE 18 may determine that the coverage identifier of the second base station changed less than the threshold number of time over the above-mentioned particular time period. Based on the UE 18 determining that the second base station did not experience the threshold high extent of change of the second base station's coverage identifier, the UE 18 may invoke a process to cause the UE 18 to be served by the second base station. For instance, based on the determining that the second base station did not experience the threshold high extent of change, the UE 18 may decide to specify the second base station in a measurement report. And in another instance, based on the determining that the second base station did not experience the threshold high extent of change, the UE 18 may decide to engage in attach signaling with the second base station. Other examples and instances are also possible.

In a further aspect, after configuring of the UE 18 as described above, the UE 18 may detect that the first base station is no longer experiencing the threshold high extent of change of the first base station's coverage identifier and may responsively no longer seek to avoid service by the first base station. For example, after configuring of the UE 18 as described above, the UE 18 may reset the counter to a value of zero and may evaluate the first base station's coverage identifier for another time period. In doing so, the UE 18 may determine that the coverage identifier of the first base station changed less than a threshold number of time over that time period and may responsively take steps to no longer avoid service by the first base station. For instance, the UE 18 may reconfigure itself by removing the above-mentioned stored indication that the UE 18 should not be served by the first base station. Other examples are also possible.

Figure 3:
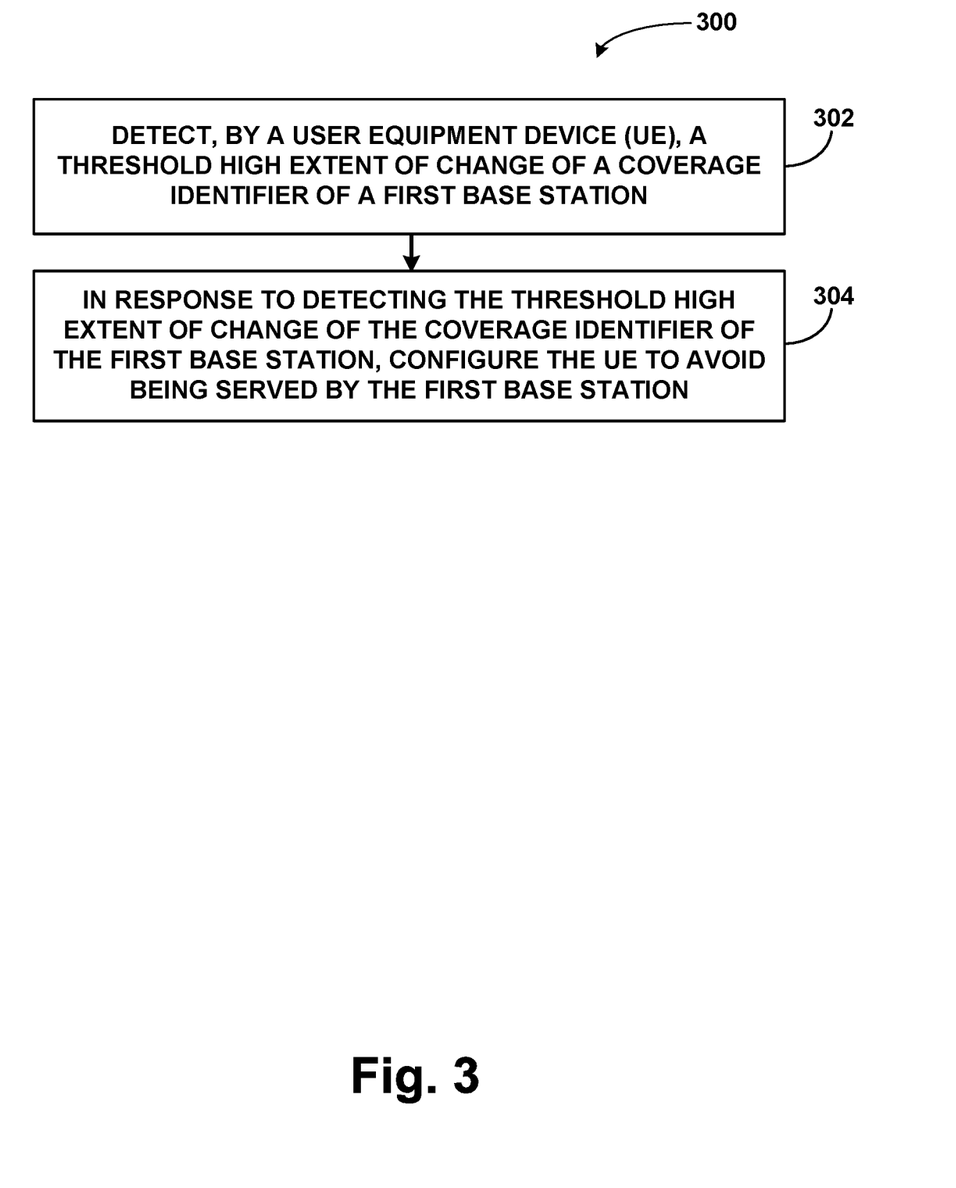
FIG. 3 is a flow chart depicting example operations in accordance with the present disclosure.

FIG. 3 is next a flow chart illustrating a method 300 according to an example embodiment. Illustrative methods, such as method 300, may be carried out in whole or in part by component(s) and/or arrangement(s) in a wireless communication system, such as with one or more of the components of the example UE shown in FIG. 4 and further discussed below or with one or more of the components of the example relay-UE shown in FIG. 5 and further discussed below, among other possibilities. However, it should be understood that example methods, such as method 300, may be carried out by other entities or combinations of entities as well as in other arrangements, without departing from the scope of the disclosure.

As shown by block 302 in FIG. 3, method 300 involves a UE detecting a threshold high extent of change of a coverage identifier of a first base station. Further, at block 304, method 300 then involves responding to the detecting by configuring the UE to avoid being served by the first base station.

Figure 4:
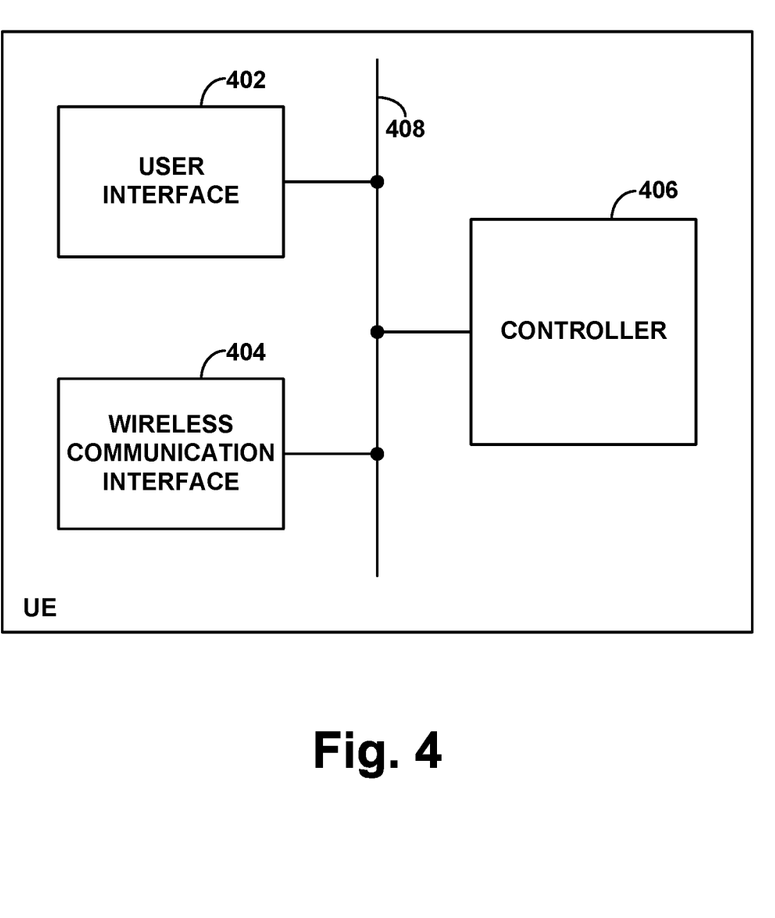
FIG. 4 is a simplified block diagram of an example UE operable in accordance with the present disclosure.

FIG. 4 is next a simplified block diagram of an example UE (e.g., end-user UE), showing some of the components that can be included in such a UE. As shown in FIG. 4, the example UE includes a user interface 402, a wireless communication interface 404, and a controller 406, all of which may reside within or on a housing and be integrated or communicatively linked together by a system bus, network, or other connection mechanism 408.

User interface 402 is configured to allow the UE to receive user input and provide user output. Thus, the user interface may include one or more input components such as a microphone, a camera, a keypad, and a touch-sensitive display. And the user interface may include one or more output components such as a sound speaker and a display screen. Further, the user interface may include analog-digital conversion circuitry, such for converting voice input to a digital representation of the voice and for converting a digital representation of voice into speech output.

Wireless communication interface 404 is configured to allow the UE to engage in wireless communication over the air interface with a base station. In particular, the wireless communication interface 404 may include or be interconnected with one or more antenna structures each arranged to facilitate air interface communications. Also, the interface 404 may include a processing unit programmed with program instructions to facilitate communication in accordance with one or more communication protocols for instance.

Controller 406, which may effectively be part of the wireless communication interface or may be provided separately, may then or therefore be configured to cause the UE to carry out various UE operations, such as those described herein. As such, the controller 406 may take various forms. For instance, the controller 406 may be hard coded or provided as hardware such as an application specific integrated circuit or other structure. Alternatively or additionally, the controller 406 could be provided as one or more processors (e.g. one or more microprocessors), non-transitory data storage, and program instructions stored in the data storage and executable by the processor(s) to carry out the various operations.

Figure 5:
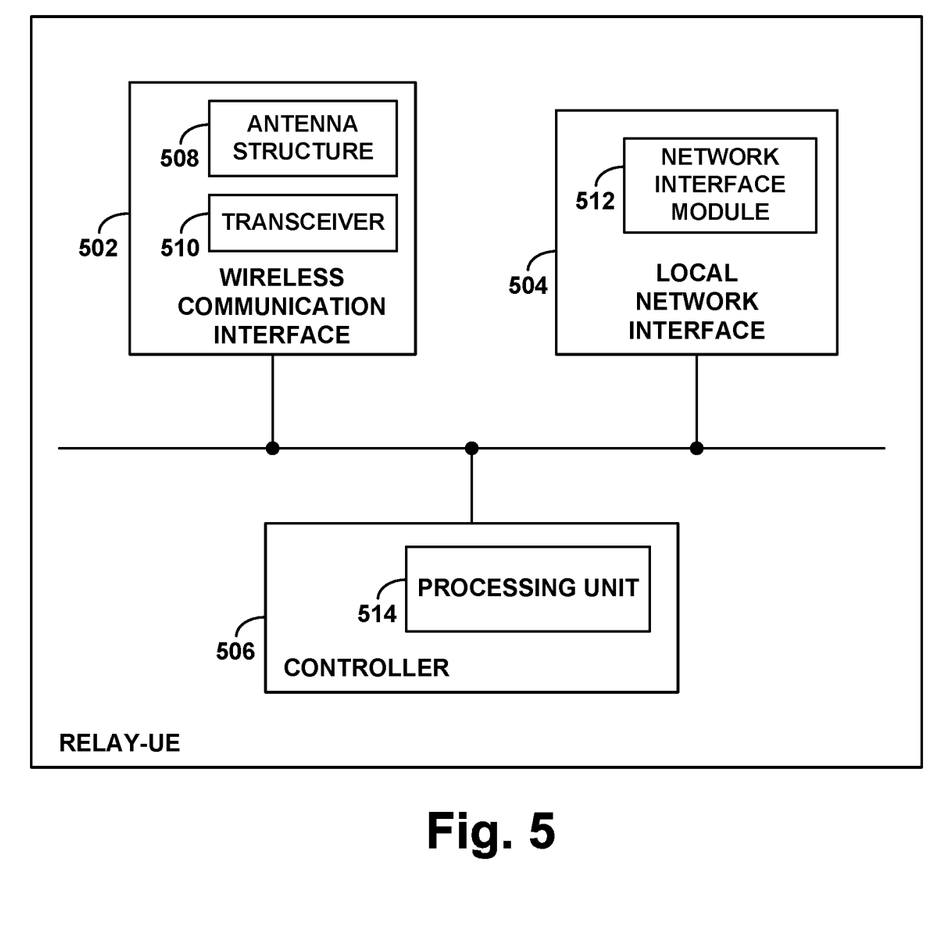
FIG. 5 is a simplified block diagram of an example relay-UE operable in accordance with the present disclosure.

Finally, FIG. 5 is a simplified block diagram of a relay-UE, showing some of the components that such an entity could include. As shown, the relay-UE includes a wireless communication interface 502, a local network interface 504, and a controller 506, any or all of which could be integrated together in various ways. In particular, the wireless communication interface 502 could include an antenna structure 508 and transceiver 510, for communicating over the air interface with a donor base station. The local network interface 504 could include a network interface module (e.g., Ethernet module) 512 for communicating with a relay-BS. And the controller 506 could include a processing unit 514 (e.g., one or more microprocessors or the like) programmed with instructions to carry out various relay-UE operations, such as those described herein.

Exemplary embodiments have been described above. It should be understood, however, that variations from these embodiments are possible, while remaining within the true spirit and scope of the invention.

We claim:

1. A method comprising:
    detecting, by a user equipment device (UE), a threshold high extent of change of a coverage identifier of a first base station, wherein detecting the threshold high extent of change of the coverage identifier of the first base station comprises determining that the coverage identifier of the first base station changed at least two times; and
    in response to detecting the threshold high extent of change of the coverage identifier of the first base station, configuring the UE to avoid being served by the first base station.

2. The method of claim 1, wherein detecting the threshold high extent of change of the coverage identifier of the first base station further comprises determining that the coverage identifier of the first base station changed at least two times over a particular time period.

3. The method claim 2, wherein the first base station is part of a wireless communication system that also includes at least a second base station, the method further comprising:
    making a determination, by the UE, that a coverage identifier of the second base station changed less than two times over the particular time period; and
    based on the determination and on the UE being configured to avoid being served by the first base station, invoking a process to cause the UE to be served by the second base station.

4. The method of claim 1, wherein the first base station is part of a wireless communication system that also includes at least a second base station, the method further comprising:
    based on the UE being configured to avoid being served by the first base station, invoking an attachment process to attach the UE to the second base station rather than invoking an attachment process to attach the UE to the first base station.

5. The method of claim 1, wherein the UE is being served by the first base station while detecting the threshold high extent of change of the coverage identifier of the first base station, wherein the first base station is part of a wireless communication system that also includes at least a second base station, and wherein configuring the UE to avoid being served by the first base station comprises engaging, by the UE, in communication with the wireless communication system to trigger a handover of the UE from being served by the first base station to being served by the second base station.

6. The method of claim 1, wherein configuring the UE to avoid being served by the first base station comprises storing, at a data storage of the UE, an indication that the UE should not be served by the first base station.

7. The method of claim 1, wherein the UE maintains a counter indicative of an extent of change of the coverage identifier of the first base station, the method further comprising:
    detecting, by the UE, an instance of change of the coverage identifier of the first base station; and
    in response to detecting the instance of change of the coverage identifier of the first base station, incrementing, by the UE, the counter by a value of one.

8. The method of claim 7, wherein detecting the threshold high extent of change of the coverage identifier of the first base station comprises determining that the value of the counter is at or above a threshold value of two.

9. The method of claim 7, further comprising:
    receiving, by the UE, one or more first signals that indicate a first coverage identifier value of the first base station and a unique identifier of the first base station, and responsively maintaining first mapping data that maps (i) the first coverage identifier value with (ii) the unique identifier;
    receiving, by the UE, one or more second signals that indicate a second coverage identifier value of the first base station and the unique identifier of the first base station, and responsively maintaining second mapping data that maps (i) the second coverage identifier value with (ii) the unique identifier; and
    making a comparison, by the UE, between the first and second mapping data, wherein detecting the instance of change is based on the comparison.

10. The method of claim 9, wherein detecting the instance of change based on the comparison comprises:
    determining that (i) the first and second mapping data each include the unique identifier and that (ii) the first coverage identifier value is different from the second coverage identifier value; and
    based on the determining that (i) the first and second mapping data each include the unique identifier and that (ii) the first coverage identifier value is different from the second coverage identifier value, detecting the instance of change of the coverage identifier of the first base station.

11. The method of claim 1, wherein the first base station is part of a wireless communication system that also includes at least a second base station, the method further comprising:
    generating, by the UE, a measurement report specifying detected coverage of one or more candidate base stations, wherein the second base station is one of the one or more candidate base stations, and wherein generating the measurement report comprises, based on the UE being configured to avoid being served by the first base station, excluding the first base station from being specified in the measurement report; and
    transmitting, by the UE, the measurement report to the wireless communication system.

12. The method of claim 11,
    wherein generating a measurement report specifying detected coverage of one or more candidate base stations comprises generating the measurement report to specify detected coverage of two or more candidate base stations,
    wherein the measurement report specifying detected coverage comprises the measurement report specifying a detected signal strength respectively for each of the two or more candidate base stations,
    wherein the detected signal strength respectively specified for the second base station is the strongest detected signal strength among the two or more detected signal strengths specified in the measurement report, and
    wherein transmitting the measurement report to the wireless communication system invokes, based on the detected signal strength respectively specified for the second base station being the strongest detected signal strength among the two or more detected signal strengths specified in the measurement report, a process to cause the UE to be served by the second base station.

13. The method of claim 1, wherein the first base station is part of a wireless communication system that also includes at least a second base station, the method further comprising:
  making a determination, by the UE, that the second base station is a base station other than the first base station; and
  based on the determination and on the UE being configured to avoid being served by the first base station, invoking a process to cause the UE to be served by the second base station.

14. The method of claim 1, wherein the UE is a relay-UE that provides wireless backhaul connectivity for a relay base station (relay-BS), wherein the relay-BS is configured to serve one or more end-user UEs over a relay coverage interface, wherein the relay-UE is being served by the first base station over a first relay backhaul air interface between the first base station and the relay-UE, wherein the first base station is part of a wireless communication system that also includes at least a second base station, and wherein configuring the relay-UE to avoid being served by the first base station comprises:
  engaging, by the relay-UE, in communication with the wireless communication system to trigger a handover of the relay-UE from being served by the first base station over the first relay backhaul air interface to being served by the second base station over a second relay backhaul air interface between the second base station and the relay-UE.

15. A user equipment device (UE) comprising:
  one or more processors;
  a data storage; and
  program instructions stored on the data storage and executable by the one or more processors to:
    detect a threshold high extent of change of a coverage identifier of a first base station, wherein the program instructions being executable to detect the threshold high extent of change of the coverage identifier of the first base station comprises the program instructions being executable to determine that the coverage identifier of the first base station changed at least two times; and
    in response to detecting the threshold high extent of change of the coverage identifier of the first base station, configure the UE to avoid being served by the first base station.

16. The UE of claim 15, wherein the program instructions being executable to detect a threshold high extent of change of a coverage identifier of a first base station further comprises the program instructions being executable to determine that the coverage identifier of the first base station changed at least two times over a particular time period.

17. The UE of claim 15, wherein the program instructions being executable to configure the UE to avoid being served by the first base station comprises the program instructions being executable to store, at the data storage, an indication that the UE should not be served by the first base station.

18. A relay comprising:
  a relay base station (relay-BS) operable to serve one or more end-user user equipment devices (end-user UEs) over a relay coverage interface;
  a relay-UE operable to provide wireless backhaul connectivity for the relay-BS; and
  a controller configured to carry out operations including:
    detecting a threshold high extent of change of a coverage identifier of a first base station, wherein detecting the threshold high extent of change of the coverage identifier of the first base station comprises determining that the coverage identifier of the first base station changed at least two times; and
    in response to detecting the threshold high extent of change of the coverage identifier of the first base station, configuring the relay-UE to avoid being served by the first base station.

19. The relay of claim 18, wherein the relay-UE is operable to be served by the first base station over a first relay backhaul air interface between the first base station and the relay-UE, wherein the first base station is part of a wireless communication system that also includes at least a second base station, and wherein configuring the relay-UE to avoid being served by the first base station comprises:
  engaging in communication with the wireless communication system to trigger a handover of the relay-UE from being served by the first base station over the first relay backhaul air interface to being served by the second base station over a second relay backhaul air interface between the second base station and the relay-UE.

20. The relay of claim 18, wherein the controller is part of the relay-UE and causes the relay-UE to carry out the operations.

* * * * *